United States Patent [19]

Eto et al.

[11] Patent Number: 4,747,055
[45] Date of Patent: May 24, 1988

[54] DRIVING STATUS DISCRIMINATION DEVICE FOR A MOTOR VEHICLE

[75] Inventors: Kunihiko Eto, Toyota; Yutaka Mori, Okazaki; Shigeo Tanooka, Okazaki; Akihiro Ohno, Okazaki, all of Japan

[73] Assignee: Toyoda Koki Kabushiki Kaisha, Okazaki, Japan

[21] Appl. No.: 837,140

[22] Filed: Mar. 7, 1986

[30] Foreign Application Priority Data

Mar. 27, 1985 [JP] Japan .................................. 60-62939
Mar. 28, 1985 [JP] Japan .................................. 60-64093

[51] Int. Cl.$^4$ ......................... B62D 6/00; G06F 15/20
[52] U.S. Cl. .................................... 364/424; 180/142; 280/707
[58] Field of Search ................ 364/424; 180/141, 142, 180/143, 140; 280/707, 708

[56] References Cited

U.S. PATENT DOCUMENTS

| | | | |
|---|---|---|---|
| 4,476,529 | 10/1984 | Nakamura et al. | 364/424 |
| 4,533,962 | 8/1985 | Decker et al. | 360/5 |
| 4,564,214 | 1/1986 | Tokunaga et al. | 280/707 |
| 4,574,905 | 3/1986 | Asano et al. | 180/142 |
| 4,593,358 | 6/1986 | Takeshima et al. | 364/424 |
| 4,602,695 | 7/1986 | Takeshima et al. | 180/143 |
| 4,621,832 | 11/1986 | Nakashima et al. | 280/707 |
| 4,621,833 | 11/1986 | Soltis | 280/707 |
| 4,626,994 | 12/1986 | Yabe et al. | 364/424 |

FOREIGN PATENT DOCUMENTS

0163244 12/1985 European Pat. Off. .

Primary Examiner—Parshotam S. Lall
Assistant Examiner—Thomas G. Black
Attorney, Agent, or Firm—Oblon, Fisher, Spivak, McClelland & Maier

[57] ABSTRACT

A driving status discrimination device for a motor vehicle is provided with a microcomputer, which stores in a memory a plurality of the latest steering angle signals which are output from a steering angle detector each time the vehicle runs a predetermined distance. The microcomputer processes the steering angle signals stored in the memory to calculate a discrimination value and then, compares the discrimination value with a predetermined reference value, so that the driving state of the vehicle can be judged to be either of a mountain road driving and a town street driving. To calculate the discrimination value, the microcomputer in one embodiment searches said memory for some of the steering angle signals whose values belong to a particular one of classification intervals and calculates the ratio of said searched steering angle signals to all of the steering angle signals stored in the memory. Also to calculate the discrimination value, the microcomputer in another embodiment calculates a mean value of absolute values of the steering angle signals stored in the memory.

4 Claims, 7 Drawing Sheets

DRIVING STATUS DISCRIMINATION DEVICE FOR A MOTOR VEHICLE

BACKGROUND OF THE INVENTION

1. Field of the Invention:

The present invention relates to a driving status discrimination device for use in controlling a power steering device, suspension mechanisms or the like in accordance with the driving status of a motor vehicle.

2. Discussion of the Prior Art:

Generally, the driving status of a motor vehicle is judged based upon the vehicle speed. In a known power steering device, for example, the result of such a judgement is utilized to control the assisting power in such a manner that the steering wheel is made light during a low speed running and heavy during a high speed running.

In the prior art wherein the driving status is judged based upon the vehicle speed as described above, the assisting power control, for instance, has such a problem that the control pattern of the assisting power relative to the vehicle speed, steering angle and the like is invariable regardless of whether the vehicle runs on a mountain road or a town street, thereby making it impossible to obtain an assisting power which meet the vehicle driving status. A similar problem arises in controlling the height of a vehicle or the rigidity or shock absorption capability of suspension mechanisms.

To solve the aforementioned problem, there has been developed a steering power control system wherein a plurality of control patterns defining various assisting powers are provided to be manually selected depending upon the driver's preference or the vehicle driving status. However, the manual selection of such control patterns disadvantageously causes the vehicle driver to make a correct judgement of the driving status as well as to do a timely manipulation, and the automatic judgement of the vehicle driving status is therefore needed to obviate the drawbacks attributed to the nature of manual selection.

SUMMARY OF THE INVENTION

Accordingly, it is a primary object of the present invention to provide a driving status discrimination device capable of automatically and reliably judging the vehicle driving status.

Another object of the present invention is to provide a driving status discrimination device of the character set forth above which has a capability of distinctly discriminating a mountain road driving from a town street driving.

A further object of the present invention is to provide a driving status discrimination device of the character set forth above wherein a data analytical tool in statistics is utilized for reliable judgement of the vehicle driving status.

Briefly, a driving status discrimination device according to the present invention includes a steering angle detector for detecting the rotational angle of a steering wheel of the vehicle. A memory device stores the steering angle signal input thereto from the detector at a predetermined interval and deletes the oldest steering angle signal after the number of the steering angle signals stored therein reaches a predetermined value, so as to store a predetermined number of the newest steering angle signals. A signal processor processes the steering angle signals stored in the memory device and calculates a discrimination value which makes a reference for discrimination of a mountain road driving from a town street driving. A judgement device discriminates the mountain road driving from the town street driving in response to the discrimination value from the signal processor.

With this configuration, the rotational position of the steering wheel is analyzed each time the vehicle runs for a predetermined time period or through a predetermined driving distance. Considering rotations of a steering wheel in a statistical viewpoint, a town street driving requires small angle rotations at a large frequency and large angle rotations at not a small frequency. On the other hand, a mountain road driving requires medium angle rotations at a large frequency due to many curves and samll and large angle rotations at smaller frequencies than those in the town street driving. Accordingly, the discrimination of the mountain road driving from the town street driving can be reliably effected through such an analysis of the steering wheel rotation.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of the preferred embodiments, wherein like reference numerals designate identical or corresponding parts throughout the several views, and in which:

FIGS. 4IA-4IIB are graphs showing variations in electric currents applied to solenoid valves of the mechanisms shown in FIGS. 2 and 3;

DETAILED DESCRIPTION OF THE PREFERRED EMBODIMENTS

Figure 1:
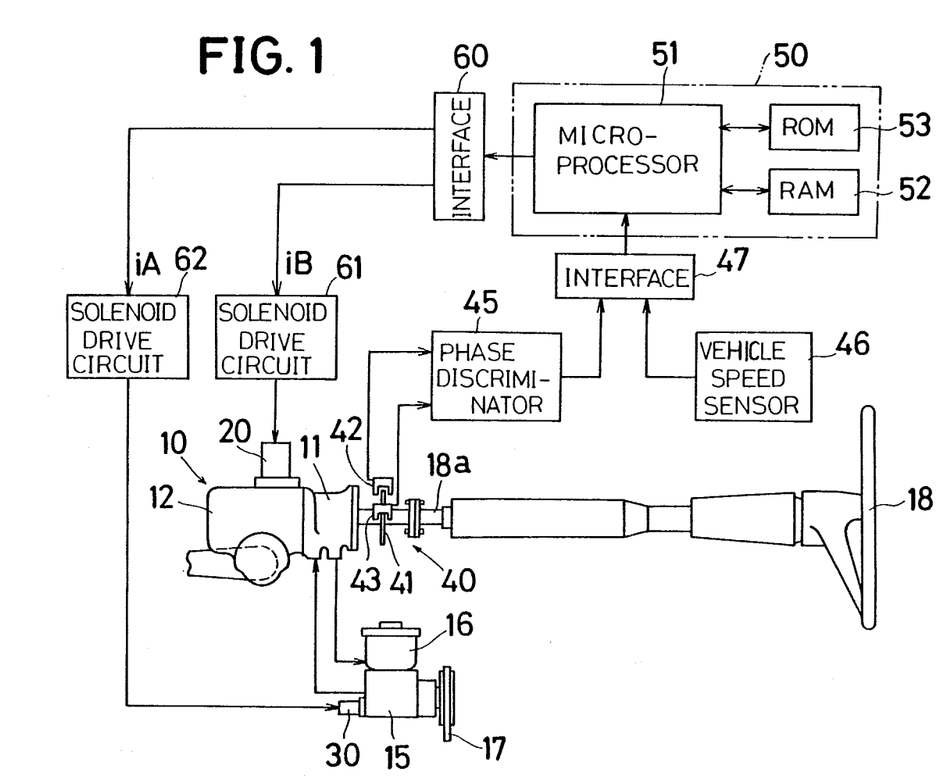
FIG. 1 is a block diagram of a power steering system to which a driving status discrimination device according to the presen invention is applied.

Referring now to the drawings and particularly to FIG. 1 thereof, a power steering device 10 is composed of a servovalve 11 and a power cylinder 12. The servovalve 11 is coupled to a steering wheel 18 through a steering column 18a, while the power cylinder 12 is coupled to steerable wheels (not shows) through link mechanisms (not shown). As well known in the art, when a manual steering torque is applied to the steering wheel 18, an output steering torque increased by the power cylinder 12 is transmitted to the steerable wheels. The steering device 10 is supplied with pressurized fluid from a pump 15 which is drivingly connected to an automotive engine (not shown) through a driving belt 17.

Figure 2:
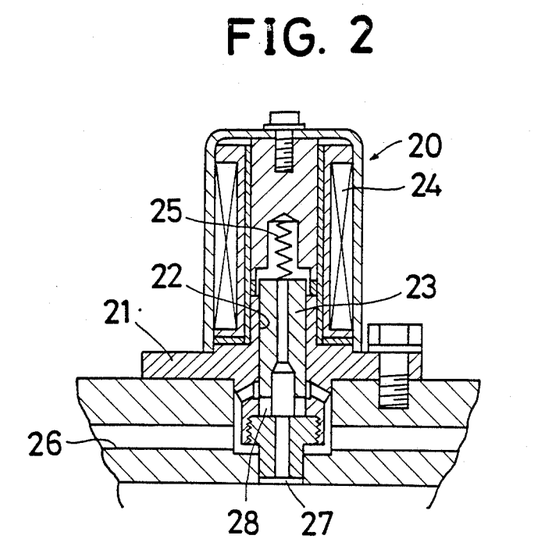
FIG. 2 is a fragmentary sectional view of a fluid bypass mechanism incorporated into a power cylinder 12 shown in FIG. 1.

A solenoid valve 20 is provided for controlling the bypass fluid communication between opposite chambers of the power cylinder 12 which are selectively supplied with pressurized fluid from the pump 15 through the servovalve 11, so as to control an assisting power generated by the power cylinder 12. As shown in FIG. 2 in detail, the valve 20 is provided with a spool 23, which is slidably received in a hole 22 of a valve body 21, and a solenoid 24. The spool 23 is normally held by a spring 25 at its lower stroke end to discontinue the communication of passages 26, 27 which respectively lead to the opposite chambers of the power cylinder 12. However, when the solenoid 24 is energized to attract the spool 23, the spool 23 is displaced upwardly against the force of the spring 25, so that the passages 26, 27 communicate with each other through a bypass slit 28.

Figure 3:
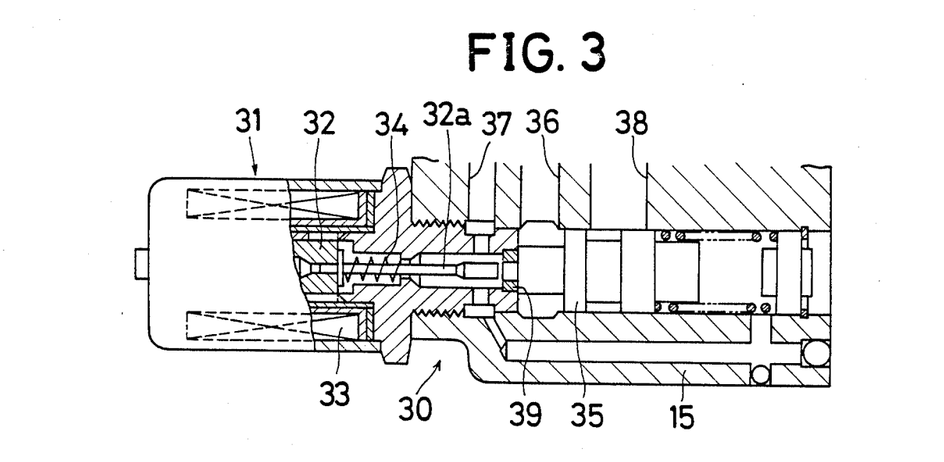
FIG. 3 is a fragmentary sectional view of a flow control mechanism incorporated into a pump 15 shown in FIG. 1.

As illustrated in FIG. 3, a flow control valve 30 for controlling the exhaust volume of the pump 15 is composed of a solenoid valve 31 for adjusting the opening degree of a throttle 39, and a valve spool 35 which slides in response to the pressure difference across the throttle 39 to open and close a bypass hole 38 for controlling pressurized fluid which is supplied from an outlet hole 36 to the servovalve 11 through a delivery port 37. The solenoid valve 31 is provided with a movable spool 32, integrally connected with a valve rod 32a, and a solenoid 33. The movable spool 32 is normally urged by a spring 34 toward the left as viewed in FIG. 3 to fully open the throttle 39. However, as the energization of the solenoid 33 causes the movable spool 32 to be displaced towards the right against the spring 34, the valve rod 32a approaches the throttle 39 to decrease the opening degree, and thus, the valve spool 35 is moved to decrease the volume of pressurized fluid supplied to the servovalve 11.

Referring back to FIG. 1, a reference numeral 50 denotes an electronic controller. This controller 50 is primarily composed of a microprocessor 51, a random access memory (hereafter referred to as "RAM") 52, and a read-only memory (hereafter referred to as "ROM") 53. The microprocessor 51 is coupled through an interface 60 to solenoid drive circuits 61, 62 for controlling electric currents (iB, iA) applied to the solenoids 24, 33 of the solenoid valves 20, 31. The microprocessor 51 is also coupled to a steering angle sensor 40 through an interface 47 and a phase discrimination circuit 45. The steering angle sensor 40 comprises a rotary disc 41 secured to the steering column 18a and two photo interrupters 42, 43 and detects the steering angle ($\theta$s) based upon the signals from the photo interrupters 42, 43. Further, the microprocessor 51 is coupled to a vehicle speed sensor 46 through the interface 47. The vehicle speed sensor 46 may be composed of a tachometer, which is drivingly connected to an output shaft of a transmission mechanism (not shown) for detecting the vehicle speed based upon the frequency at which pulse signals are generated by the vehicle speed sensor 46.

Figure 4:
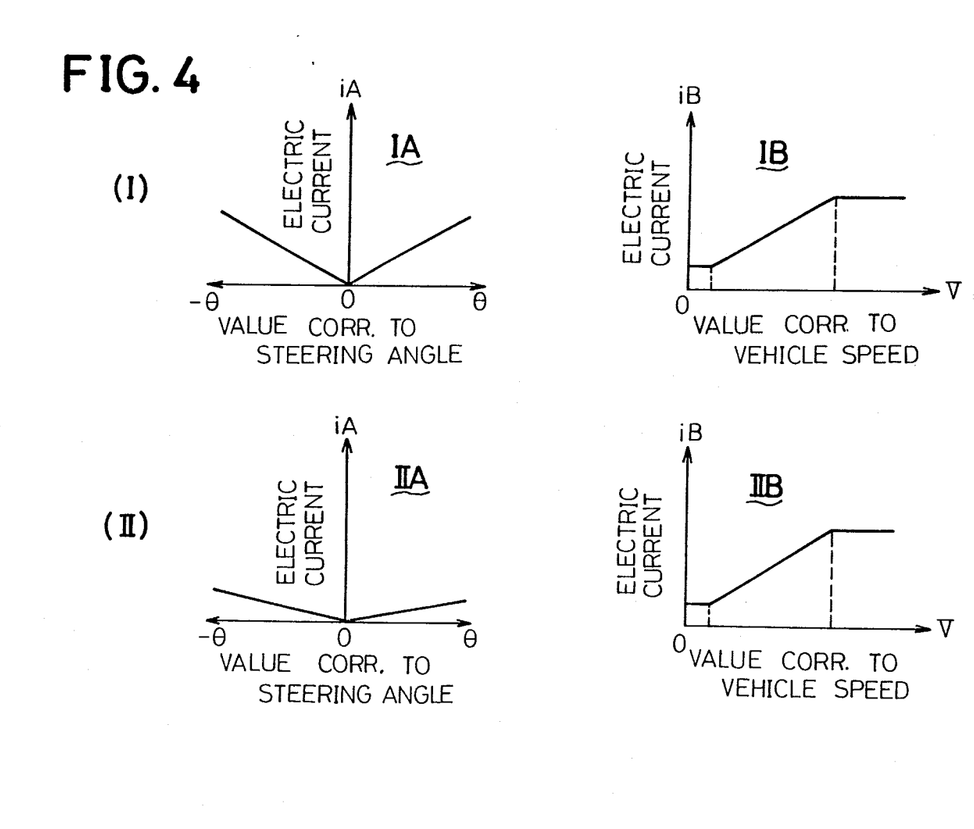

The ROM 53 stores in the form of characteristic maps control patterns each defining electric currents (iB, iA) applied to the solenoids 24, 33 of the solenoid valves 20, 31. As shown in FIG. 4, the control patterns include a control pattern I which is a combination of characteristic maps IA, IB for use in mountain road driving and another control pattern II which is a combination of characteristic maps IIA, IIB for use in town street driving. The characteristic maps IA, IIA are used for driving the solenoid 33 of the flow control valve 30, while the characteristic maps IB, IIB are used for driving the solenoid 24 of the solenoid valve 20.

In the control pattern I for the mountain road driving, the characteristic according to which the electric current (iB) to be applied to the solenoid 24 varies relative to a value or parameter (V) corresponding to the vehicle speed and the characteristic according to which the electric current (iA) to be applied to the solenoid 33 varies relative to another parameter ($\theta$) corresponding to the steering angle are each set to be increased at a substantially constant rate, as indicated in the characteristic maps IB, IA. Thus, according to the control pattern I, a required manual steering torque becomes large gradually with increases in the vehicle speed as well as in the steering angle. It is to be noted that the gradients in the characteristic maps IB, IA are determined so that the required manual steering torque is moderately increased to enable the vehicle driver to feel the load resistance. This prevents the steering wheel from being excessively turned in the mountain road driving to thereby ensure a stable steering feeling transmitted to the vehicle driver.

On the other hand, in the control pattern II for the town street driving, the variation characteristic of the electric current (iB) relative to the parameter (V) is set to be almost the same as that in the characteristic map IB, as indicated in the characteristic map IIB, while the variation characteristic of the electric current (iA) relative to the parameter ($\theta$) is set to have a smaller gradient than that in the characteristic map IA, as indicated in the characteristic map IIA. Accordingly, in the town street driving, the required manual steering torque becomes large with increases in the vehicle speed at the same rate as in the case of the mountain road driving, but it does not become large with increases in the steering angle to the extent that it corresponds to values in the mountain road driving, so that the characteristic is appropriate to the town street driving during which the steering wheel is frequently turned within large angles.

The RAM 52 has a storage area for storing a predetermined number of parameters ($\theta$) each corresponding to a steering angle ($\theta$s). The ROM 53 stores a driving status discrimination program, which enables the microprocessor 51 to store parameters ($\theta$), corresponding to steering angles ($\theta$s) detected by the steering angle sensor 40, one after another in the RAM 52 at a predetermined time interval for renewal purpose, and to count the frequency of parameters ($\theta$) other than those within center and opposite end intervals a classified in the form of a histogram. The program further enables the microprocessor 51 to calculate an index (J) representative of the driving status (hereafter referred to as "mountain road index") based upon the counted frequency and all of the stored parameters ($\theta$), to make a judgement of whether the vehicle is in the town street driving status or in the mountain road driving status, and to select based upon the result of such a judgement the control patterns I, II for the electric currents (iA), (iB) to be applied to the solenoid valves 31, 20.

Figure 5A:
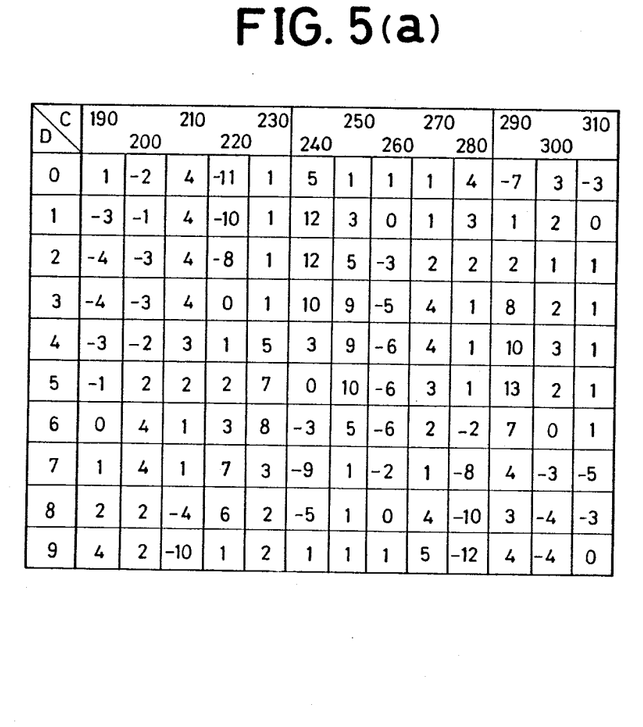
FIG. 5(a) is a data table showing values corresponding to steering angles which are actually measured at an interval of 10 meter run during a mountain road driving.
Figure 5B:
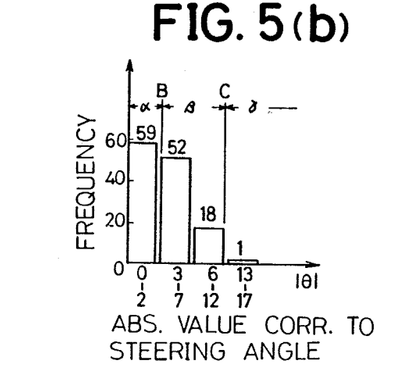
FIGS. 5(b) and 5(c) are histograms showing the distributions of absolute and real values of the values shown in FIG. 5(a)
Figure 5C:
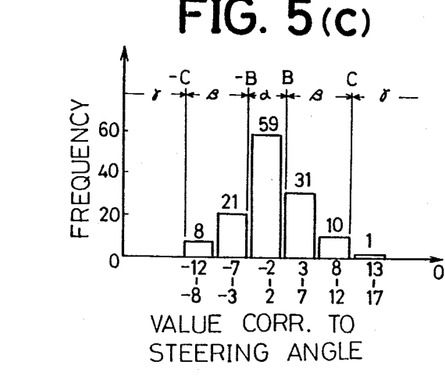
Figure 6A:
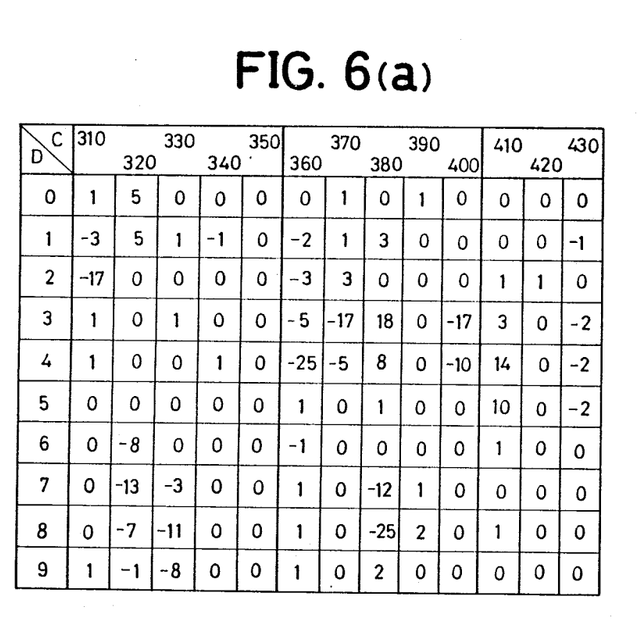
FIG. 6(a) is a data table showing values corresponding to steering angles which are actually measured at an interval of 10 meter run during a town street driving.
Figure 6B:
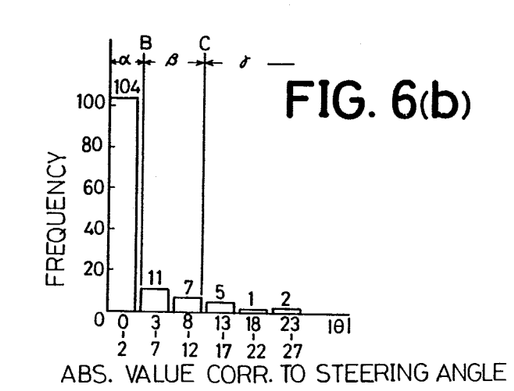
FIGS. 6(b) and 6(c) are histograms showing the distributions of the absolute and real values of the values shown in FIG. 6(a)
Figure 6C:
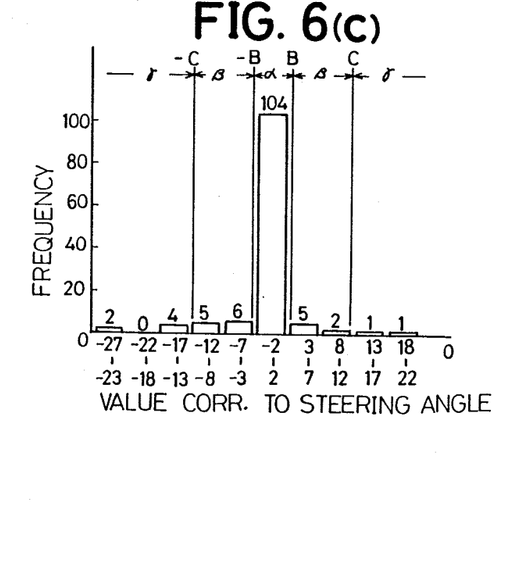

FIGS. 5(c) and 6(c) show frequency distribution of the parameters (θ) which correspond to steering angles (θs) as actually detected. In mountain road driving, the frequency distribution occurs as shown in FIG. 5(c) because of many curve turns and few right-angle turns. In town street driving, on the other hand, the frequency distribution occurs as shown in FIG. 6(c) because of few curve turns and not few right-angle turns at intersections. Consequently, the mountain road index (J) calculated in the mid curse of the execution of the discrimination program indicates a larger value in the mountain road driving than that in the town street driving. The further execution of the discrimination program permits the vehicle driving status to be automatically judged, and either of the control patterns I, II shown in FIG. 4 can be selected based upon the result of such judgement.

During the vehicle driving, the steering angle signal which momentarily varies is detected by the steering angle sensor 40 as a parameter (θ) corresponding to the steering angle (θs). The steering angle signal is input to a counter (not shown) through the phase discrimination circuit 45. The parameter (V) corresponding to a vehicle speed (Vs) detected by the vehicle speed sensor 46 is input to another counter (not shown) as well.

Figure 7:
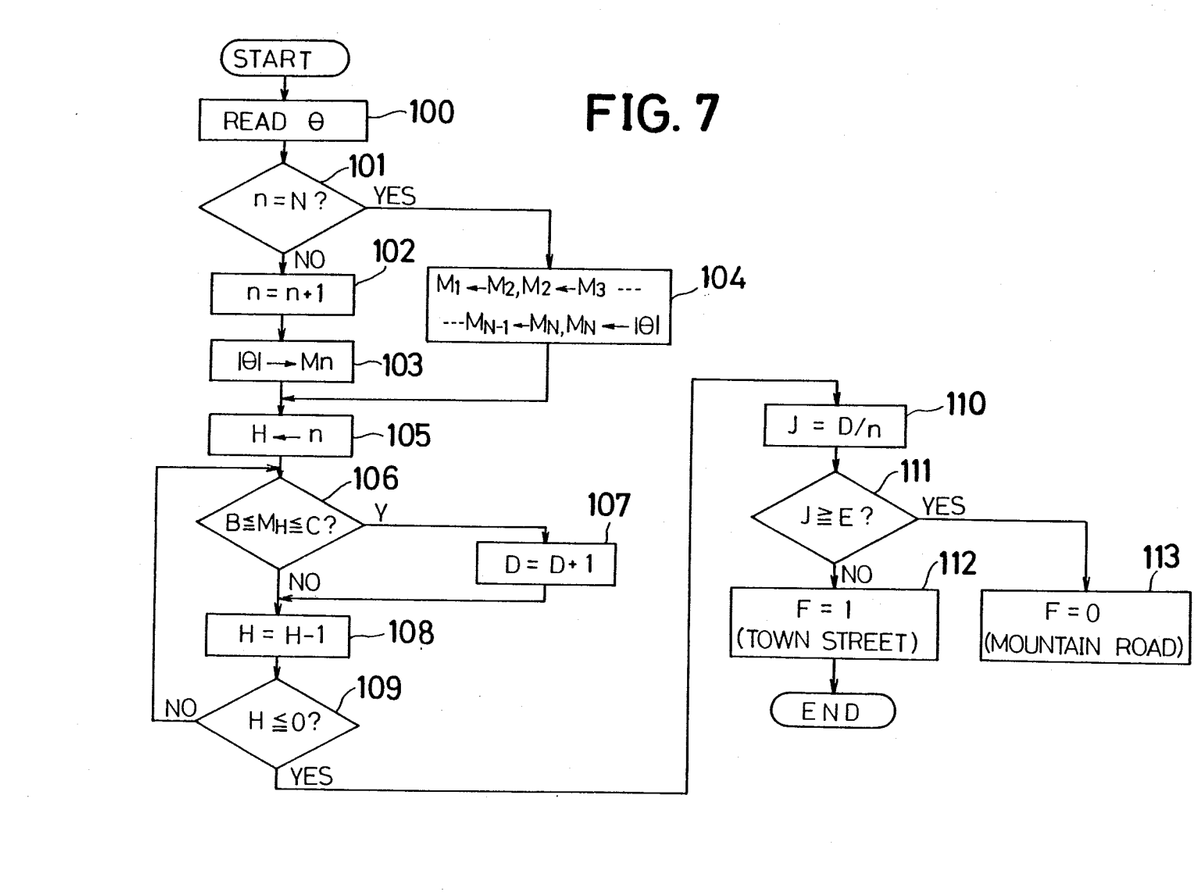
FIG. 7 is a flow chart of a driving status discrimination program executed by a microprocessor 51 shown in FIG. 1.

The microprocessor 51 executes processing operations according to the discrimination program shown in FIG. 7 in response to an interrupt signal input thereto each time a predetermined driving distance is reached. First of all, a steering angle parameter (θ) stored in the counter is read in step 100, and a count value (n) in a sampling number counter (not shown) is compared with a set value (N) in step 101. As the sampling number right after the driving start is small to satisfy n<N, the routine is advanced to step 102 to add "1" to the sampling number count value (n), and the absolute value of the parameter (θ) is stored in an n-th address Mn of the storage area of the RAM 52.

When the sampling number (n) increases to reach the set value (N), the routine is directed from step 101 to step 104, wherein the stored content is refreshed or renewed in such a manner as to shift in turn a value at address M2 to address M1, a value at address M3 to address M2 . . . , and finally, to store the absolute value of the newest (n-th) value (θ) to the last address Mn. In this situation, the sampling number count value remains to indicate n (=N).

Step 103 and step 104 are followed by step 105, in which a read-out counter (H) is set with the sampling number count value (n), and the comparison of the value(MH)at the N-th address with two set values (B and C) is made in step 106. These set values (B and C) are respectively a slightly larger value than a center interval (α) value (i.e., zero) of the stored parameters (θ) corresponding to steering angles (θs) and a smaller value than the absolute value of the value in the opposite end intervals (γ). In an example wherein actually measured values (θ) are shown in FIGS. 6(a) and 7(a), it is determined to be B=3 and C=12. Directly unless B≦MH≦C holds in step 106 or after the addition of "1" to the value (D) (which is reset each time the discrimination program is executed) of the frequency counter in step 107 if B≦MH≦C holds in step 106, step 108 follows to subtract "1" from the value (H) of the read-out counter. In step 109, the value (H) of the read-out counter is compared with a numeral "0", and the above-noted steps 106-108 are repeatedly executed until the value (H) becomes 0 (zero), so as to move to step 110 upon the confirmation of H=0. Consequently, when H=0 holds, the value (D) in the frequency counter indicates the number of stored values (Mn) each satisfying B≦Mn≦C. Step 110 is executed to calculate the mountain road index (J) based upon the following equation.

$$J = D/n$$

Ascertainment is subsequently made in step 111 as to whether the mountain road index (J) is larger than a reference value (E) or not. When J>E is ascertained, the values (θ) have a distribution shown in FIG. 5(b) to represent the mountain road driving. On the other hand, when J>E is not ascertained, the values (θ) have another distrubution shown in FIG. 6(b) to represent the town street driving. A driving status flag F is set with "1" in step 112 unless J≧E holds, while it is set with "0" in step 113 if J≧E holds. The reference value(E)is predetermined based upon the distribution of the values (θ) in each driving status. In the illustrated instance having values (θ) exemplified as referred to later, the reference value (E) is set to be 0.3.

The equation in step 110 may be $J=D/N$. In this modified case, a smaller sampling number (n) makes the mountain road index (J) smaller, so that the driving right after the driving start is judged to be a town street driving. However, as the sampling number (n) comes close to the value (N), it becomes possible to judge the actual driving status correctly. This modification is useful to avoid that too many changes in the state of the driving status flag F is caused right after the driving start due to a fewer number of sampling times.

Figure 8:
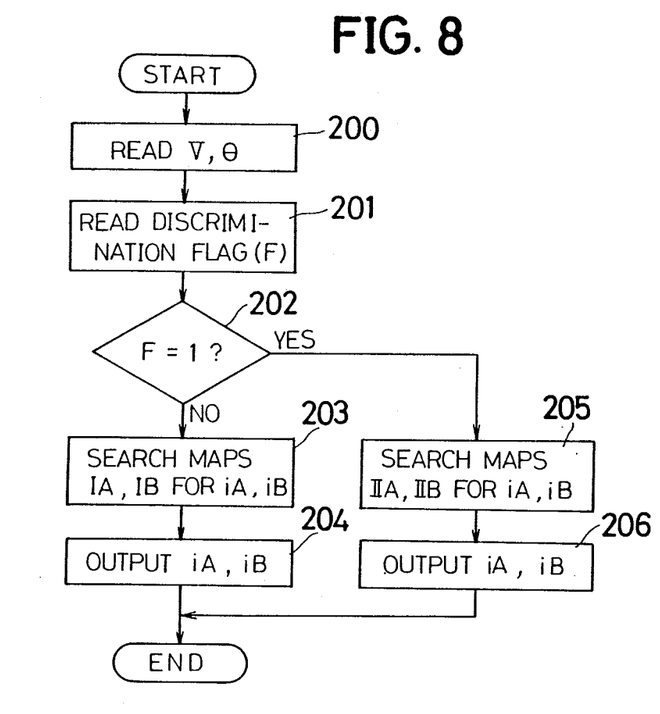
FIG. 8 is a flow chart of a solenoid drive control program executed by the microprocessor 51.

Upon completion of either of steps 112 and 113, the microprocessor 51 halts the execution of the routine shown in FIG. 7 until it receives the next interrupt signal and instead, begins to execute a solenoid drive control program shown in FIG. 8 as follows:

First of all, step 200 is executed to read values (V) and (θ) which are stored in the respective counters to represent the vehicle speed (Vs) and the steering angle (θs), and step 201 is then reached to read the state of the driving status flag F. In subsequent step 202, the value in the driving status flag F is ascertained, wherein unless F=1, the processing is advanced to steps 203 and 204, so that the characteristic maps IA, IB for mountain road driving in the ROM 53 are searched based upon the read values (θ) and (V) for electric currents (iA, iB) so as to apply the same respectively to the solenoids 33, 24 of the solenoid valves 31, 20. If F=1 in step 202, steps 205 and 206 then follow, so that the characteristic maps IIA, IIB for town street driving in the ROM 53 are searched by reference to the read values (θ) and (V) for electric currents (iA, iB) so as to apply the same to the solenoids 33 and 24 of the solenoid valves 31, 20. Upon completion either of steps 204 and 206, the microprocessor 51 halts the execution of the routine shown in FIG. 8.

In this manner, the microprocessor 51 executes the above-described programs in response to an interruption signal which is generated each time the vehicle runs a predetermined distance, whereby the assisting power is set depending upon the driving status.

FIGS. 5(a) and 6(a) indicate actual data (the number of samplings: 130) which the microprocessor 51 detected in response to an interruption signal input thereto each time the vehicle ran ten (10) meters during a mountain road driving and a town street driving. Each value ($\theta$) of the actual data represents one-eighteenth (1/18) a steering angle ($\theta s$) of the steering column 18a when the vehicle reaches a point represented by a cumulative distance C+D (scale: 10 meters). FIGS. 5(c) and 6(c) respectively show histograms in each of which actual values ($\theta$) in each of FIGS. 5(a) and 6(a) are classified at the interval of five (5) degrees, while FIGS. 5(b) and 6(b) respectively show histograms in each of which absolute values of the actual values ($\theta$) are classified at the interval of five (5) degrees.

The comparison of each histogram with a corresponding one makes the following clear. That is, in a mountain road driving involving many curve runs and few right-angle turns, the frequency of steering turns is relatively large within a medium steering angle interval ($\beta$), but is extremely small within a large steering angle interval ($\gamma$), compared with the frequency of steering turns in a small steering angle interval ($\alpha$), as shown in FIGS. 5(b) and 5(c). On the contrary, in a town street driving involving few curve turns and relatively many right-angle turns at intersections, the frequency of steering turns is extremely large within the small steering angle interval ($\alpha$) and small within the large steering angle intervals ($\gamma$) as well as within the medium steering angle interval ($\beta$). The mountain road driving and the town street driving provide for a distinct difference therebetween in the frequency distribution in the values ($\theta$) as mentioned above.

Accordingly, the above-noted mountain road index (J) is calculated by counting the frequency of the values ($\theta$) which do not include those classified within the narrow interval ($\alpha$) and those classified within wide intervals ($\gamma$) and by dividing the counted frequency by all the number (N) of the values ($\theta$). Herein, the interval ($\alpha$) makes a center interval to satisfy a relation $-B < \theta < B$, while the intervals ($\gamma$) make opposite end intervals to satisfy relations $\Lambda < -C$ and $C < \Lambda$. In the illustrated example, boundary values (B) and (C) are "3" and "12" respectively, and the frequency (D) and the mountain road index (J) respectively have values shown in the following TABLE 1 wherein standard deviations ($\sigma$) calculated from the values ($\theta$) indicated in FIGS. 5(b) and 6(b) are also recited for comparision.

TABLE 1

| | D | J | $\sigma$ |
|---|---|---|---|
| Mountain Road | 70 | 0.538 | 4.70 |
| Town Street | 18 | 0.138 | 5.28 |

The difference (ratio: 3.90) between the mountain road driving and the town street driving in the mountain road index J is larger than the difference (the ratio: 1.12) therebetween in the standard deviation ($\sigma$). Therefore, the discrimination of driving status can be reliably effected by reference to the mountain road index (J). In this case, it is proper to set "0.3" as the reference value(E)for the discrimination.

The calculation for the mountain road index (J) can also be made utilizing histograms of real figures of the values ($\theta$) shown in FIGS. 5(c) and 6(c), although the aforementioned flow chart shown in FIG. 7 is provided for calculating the mountain road index (J), utilizing the absolute values of the values ($\theta$).

Figure 9:
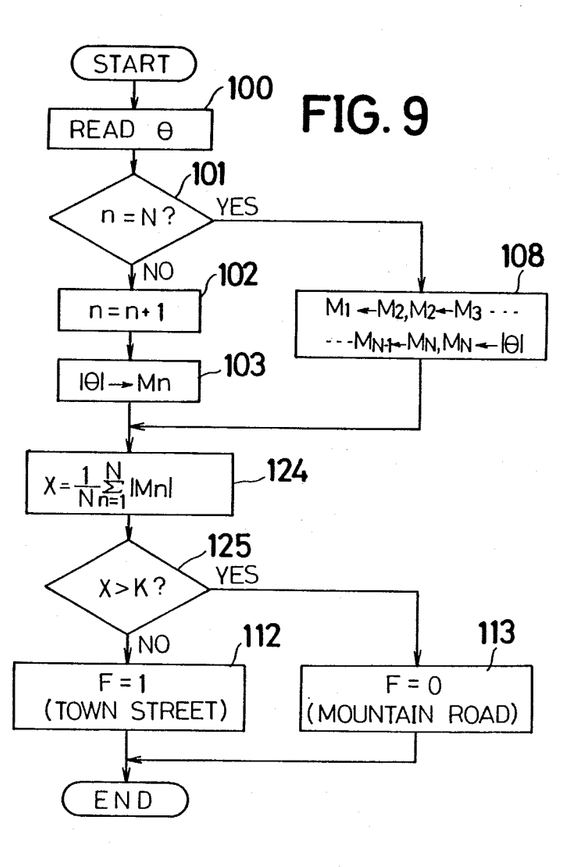
FIG. 9 is a flow chart of another driving state discrimination program executed by the microprocessor 51 in a second embodiment of the present invention.

A second embodiment of the present invention will be described hereafter. In this embodiment, for discrimination of the mountain road driving from the town street driving, a mean value (X) of the absolute values which are distributed as shown in FIGS. 5(b) and 6(b) is used instead of the above-noted mountain road index (J) as used in the foregoing first embodiment. FIG. 9 shows another driving status discrimination program which the micprocessor 51 in the second embodiment executes in place of that shown in FIG. 7. In accordance with this program, either of the aforementioned steps 103 and 108 is followed by step 124, wherein a mean value (X) of values ($\theta$) each corresponding to a steering angle ($\theta s$) is calculated by the following equation.

$$X = 1/N \cdot \sum_{n=1}^{N} |Mn|$$

In step 125, it is ascertained whether the calculated means value (X) is larger than a reference value (K) or not. If $X > K$ holds, then the values ($\theta$) indicate a distribution shown in FIGS. 5(b), so that the driving status is judged to be a mountain road driving. On the contrary, if $X > K$ does not holds, the values ($\theta$) indicate another distribution shown in FIG. 6(b), so that the driving status is judged to be a town street driving. The driving status flag F is set to be "1" in step 112 if $X > K$ is not satisfied and is set to be "0" in step 107 if $X > K$ is satisfied. The reference value (K) is determined by the frequency distribution of the values ($\theta$) in each driving status and is set to be "3" in the case of the aforementioned numeral example. In accordance with the equation in step 124, the mean value (X) is small while the number of sampling times is small. Thus, the driving status is judged to be a town street driving right after the driving start, while it is judged to represent the actual driving status as the number of the sampling times reaches the predetermined number (N). This advantageously avoids that right after the driving start, the driving status flag F changes its status at a large frequency due to a few number of sampling times.

The following TABLE 2 shows the mean values (X) and a standard deviations ($\sigma$) of absolute values of the values ($\theta$) exemplified in FIGS. 5(a) and 6(a).

TABLE 2

| | X | $\sigma$ |
|---|---|---|
| Mountain Road | 3.63 | 4.70 |
| Town Street | 2.26 | 5.28 |

The difference (the ratio: 1.61) in the mean value (X) between the mountain road driving and the town street driving is larger than the difference (the ratio: 1.12) in the standard deviation ($\sigma$)therebetween, and therefore, the discrimination of the driving status can be reliably effected utilizing the mean value (X). In this case, it is proper to determine the reference value (K) to be "3". Although the mean values (X) of the mountain road driving and the town street driving are opposite in a large-small relation to the standard deviations ($\sigma$) thereof, such is due to the fact that the frequency of steering turns within a large angle is larger in the town street driving than that in the mountain road driving.

Although the above-described embodiments are applied to the steering power control in a power steering device, the present invention may be applied for the height control of a vehicle, the rigidity control of suspension mechanisms or the like.

Although each of the above-described embodiments makes the discrimination by reference to one reference value (E) or (K), there may be set a plurality of such reference values (E) or (K) at suitable intervals. In such a modified case, a plurality of characteristic maps may be prepared for respective intervals divided by the reference values (E) or (K) and may be selected depending upon the value of the mountain road index (J) or the mean value (X). This modification is useful to avoid an abrupt change-over from a mountain road characteristic map to a town street characteristic map.

Further, although the above-described first embodiment uses the mountain road index (J) which is calculated by dividing the frequency (D) of values ($\theta$) classified in the intervals ($\beta$) by the frequency (N) of all the stored values ($\theta$), a reciprocal of the mountain road index (J) may be used as such a mountain road index. Moreover, the discrimination in each of the above-described embodiments may be effected by comparing the reference value (E) or (K) with a modified value to which the mountain road index (J) or the mean value (X) is modified through a suitable calculation (e.g., division by the standard deviation ($\sigma$), rather than by directly comparing the mountain road value (J) or the mean value (X) with the boundary value (E) or (K).

Obviously, numerous modifications and variations of the present invention may be possible in light of the above teachings. It is therefore to be understood that within the scope of the appended claims, the present invention may be practiced otherwise than as specifically described herein.

What is claimed is:

1. A driving status discrimination device for a motor vehicle having a steering wheel manually rotatable by a driver, comprising:

steering angle detection means for detecting the rotational angle of said steering wheel so as to output a steering angle signal representing said detected rotational angle;

data storage means for receiving said steering angle signal from said detection means at a predetermined interval so as to store a plurality of said steering angle signals, said data storage means being operable for deleting the oldest one of said steering angle signals each time a new steering angle signal is received after said plurality of steering angle signals stored therein reaches a predetermined number; and a processing means for classifying said plurality of steering angle signals stored in said data storage means into first and second class signals, the value of each of said first class signals belonging to any of a relatively narrow interval including a center value of said plurality of steering angle signals and other intervals except for a relatively wide interval including said center value, said second class signals being the remainder of said plurality of steering angle signals;

for calculating an index value which represents the driving status of said vehicle, based upon said second class signals and all of said steering angle signals stored in said data storage means; and for discriminating a mountain road driving and a town street driving from each other responsive to said index value so as to selectively output a mountain road signal and a town street signal.

2. A driving status discrimination device as set forth in claim 1, wherein said processing means counts the number of said second class signals stored in said data storage means; and calculates said index value by effecting a division between the number of said second class signals and all the number of said steering angle signals stored in said data storage means.

3. A driving status discrimination device as set forth in claim 2, wherein said processing means further compares said index value calculated by said division with a predetermined value so as to discriminate said mountain road driving from said town street driving depending upon the result of such comparision.

4. A driving status discrimination device for a motor vehicle having a steering wheel manually rotatable by a driver, comprising:

steering angle detection means for detecting the rotational angle of said steering wheel so as to output a steering angle signal representing said detected rotational angle;

first counter means for counting the number of said steering angle signals each output from said detection means at a predetermined interval; and a processing means for classifying into first and second class signals a plurality of steering angle signals each output from said detection means at a predetermined interval, the value of each of said first class signals belonging to any of a relatively narrow interval including a center value representing a neutral position of said steering wheel and other intervals except for a relatively wide interval including said center value, said second class signals being the remainder of said plurality of steering angle signals;

for counting the number of said second class signals classified by said classification means;

for calculating an index value which represents the driving status of said vehicle, by dividing the number counted by said second counter means by the number counted by said first counter means; and for discriminating a mountain road driving and a town street driving from each other responsive to said index value so as to selectively output a mountain road signal and a town street signal.

* * * * *

UNITED STATES PATENT AND TRADEMARK OFFICE
CERTIFICATE OF CORRECTION

PATENT NO. : 4,747,055
DATED : May 24, 1988
INVENTOR(S) : Kunihiko ETO, et al.

It is certified that error appears in the above-identified patent and that said Letters Patent is hereby corrected as shown below:

Title page:

[73] Assignee is located in the city of "Kariya-Shi, Japan".

Signed and Sealed this

Fifteenth Day of November, 1988

Attest:

DONALD J. QUIGG

*Attesting Officer*     *Commissioner of Patents and Trademarks*